(12) United States Patent
Yao

(10) Patent No.: US 9,605,086 B2
(45) Date of Patent: Mar. 28, 2017

(54) RESIN COMPOSITION AND RESIN MOLDED ARTICLE

(71) Applicant: FUJI XEROX CO., LTD., Tokyo (JP)

(72) Inventor: Kenji Yao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/836,295

(22) Filed: Aug. 26, 2015

(65) Prior Publication Data

US 2016/0280801 A1 Sep. 29, 2016

(30) Foreign Application Priority Data

Mar. 26, 2015 (JP) ................... 2015-064763

(51) Int. Cl.
C09D 101/18 (2006.01)
C08B 3/06 (2006.01)
C08L 1/12 (2006.01)

(52) U.S. Cl.
CPC . *C08B 3/06* (2013.01); *C08L 1/12* (2013.01)

(58) Field of Classification Search
CPC ...................................... C08B 3/06
USPC ........................................ 524/31
See application file for complete search history.

(56) References Cited

U.S. PATENT DOCUMENTS

| | | | |
|---|---|---|---|
| 2002/0183764 A1 | 12/2002 | Kinugasa et al. | |
| 2008/0194807 A1 | 8/2008 | Buchanan et al. | |
| 2010/0029927 A1 | 2/2010 | Buchanan et al. | |
| 2010/0228019 A1* | 9/2010 | Umemoto | C08B 3/16 536/63 |
| 2010/0280161 A1 | 11/2010 | Abe et al. | |
| 2012/0165517 A1 | 6/2012 | Uehira et al. | |
| 2012/0196998 A1* | 8/2012 | Iji | C08B 3/16 527/303 |
| 2014/0024824 A1 | 1/2014 | Tanaka et al. | |
| 2016/0200836 A1 | 7/2016 | Tanaka et al. | |

FOREIGN PATENT DOCUMENTS

| | | | | |
|---|---|---|---|---|
| GB | 721305 A | * | 1/1955 | ............... B29D 7/01 |
| JP | 50-069161 | | 6/1975 | |
| JP | H04-261401 A | | 9/1992 | |
| JP | 2002-114687 A | | 4/2002 | |
| JP | 2009-035515 A | | 2/2009 | |
| JP | 2010-518244 A | | 5/2010 | |
| JP | 2010/126637 A | | 6/2010 | |
| JP | 2011-057959 A | | 3/2011 | |
| JP | 2011-530643 A | | 12/2011 | |
| WO | 2011/122421 A1 | | 10/2011 | |
| WO | 2012/137622 A1 | | 10/2012 | |
| WO | 2015/025761 A1 | | 2/2015 | |

OTHER PUBLICATIONS

Kiuchi et al., J. Appl. Polym. Sci., 39829, 2014.*
Jul. 26, 2016 Notification of Reasons for Refusal issued in Japanese Patent Application No. 2015-188594.
Nov. 25, 2016 Office Action issued in Japanese Patent Application No. 2015-188594.

* cited by examiner

*Primary Examiner* — Hui Chin
(74) *Attorney, Agent, or Firm* — Oliff PLC

(57) ABSTRACT

A resin composition includes a cellulose derivative, wherein a saturated water absorption of the resin composition is in a range of 7% or greater.

14 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2015-064763 filed Mar. 26, 2015.

BACKGROUND

1. Technical Field

The invention relates to a resin composition and a resin molded article.

2. Related Art

In the past, various kinds of resin compositions were provided, and used for manufacturing a resin molded article.

Recently, use of resins derived from plants is considered, and a cellulose derivative is one of the resins derived from plants.

SUMMARY

According to an aspect of the invention, there is provided a resin composition including:

a cellulose derivative, wherein a saturated water absorption of the resin composition is in a range of 7% or greater.

DETAILED DESCRIPTION

Hereinafter, exemplary embodiments which are an example of the invention are described. These exemplary embodiments and examples exemplify the invention, and do not intend to limit the scope of the invention.

With respect to the amount of each component to be contained in a composition as described in the specification, if plural kinds of materials exist as a certain component in the composition, the amount mean a total amount of the plural kinds of materials existing in the composition, unless described otherwise.

Resin Composition

The resin composition according to the exemplary embodiment includes a cellulose derivative, in which saturated water absorption is 7% or greater.

Here, the "cellulose derivative" used in the exemplary embodiment refers to a compound in which at least one hydroxyl group included in cellulose is substituted with a substituent.

As examples of the cellulose derivative, a cellulose derivative having a hydrocarbon group, a group including an acyl group and an alkylene oxy group, and an acyl group is known. In the cellulose derivative having such substituents, thermal fluidity is increased by decreasing a melting point, and impact resistance strength is also high.

Meanwhile, with respect to the cellulose derivative, there are cases where an elastic modulus and heat resistance is decreased in compensation for the increase of plasticity.

On the contrary, the resin composition according to the exemplary embodiment includes a cellulose derivative, in which saturated water absorption is 7% or greater. When a resin molded article is obtained from the resin composition, a resin molded article having a high elastic modulus may be obtained.

The reason is not clear, but it is assumed as follows.

Regarding the resin composition in which saturated water absorption is 7% or greater, it is meant that it has many hydroxyl groups for taking moisture, and that molecules of the cellulose derivative are appropriately separated for ease in water absorption and water retention.

Due to the existence of the substituents, adjacent molecules of the cellulose derivative are appropriately separated. Due to the hydroxyl groups existing in the molecules, hydrogen bonds are formed between the molecules of the cellulose derivative. As a result, it is considered that, in the resin composition in which the saturated water absorption is 7% or greater, distances between the molecules of the cellulose derivative are appropriately maintained, and hydrogen bonds between the molecules of the cellulose derivative exist in an almost even state (it is considered that hydrogen bonds are not unevenly distributed in resin composition).

It is assumed that, in the resin molded article which is a molded object of the resin composition, the improvement of the elastic modulus is achieved since the distribution state of the hydrogen bond and the distance between the molecules of the cellulose derivative remain substantially unchanged.

In addition, it appears that heat resistance is unlikely to be decreased, since the resin composition has many hydrogen bonds by the cellulose derivative.

Saturated Water Absorption

The saturated water absorption of the resin composition and the resin molded article according to the exemplary embodiment is measured by a method (method of measuring weight increase rate after product is immersed for 24 hours in water at 23° C.) in conformity with ISO 62 (plastics-determination of water absorption).

The saturated water absorption in the resin composition and the resin molded article according to the exemplary embodiment is 7% or greater, preferably 8% or greater, and more preferably 10% or greater. In addition, if the water absorption amount is too great, the elastic modulus tends to be decreased due to the influence of the affinitive water, and thus the saturated water absorption of the resin composition and the resin molded article according to the exemplary embodiment is preferably 20% or less.

Hereinafter, components constituting the resin composition according to the exemplary embodiment are described in detail.

Cellulose Derivative

The cellulose derivative used in the exemplary embodiment is described.

The cellulose derivative used in the exemplary embodiment is not particularly limited, but for the viewpoint of increasing saturated water absorption of the resin composition, a weight average molecular weight, a molecular structure, a content in the resin composition, and the like are preferably in the range described below.

Weight Average Molecular Weight

The weight average molecular weight of the cellulose derivative is preferably 10,000 or greater and less than 75,000, and more preferably in the range of 20,000 to 50,000.

If the weight average molecular weight is 10,000 or greater and less than 75,000, hydroxyl groups included in the resin composition increase, and hydrogen bonds between molecules of the cellulose derivative are formed, and the saturated water absorption is easily increased.

Here, the weight average molecular weight (Mw) is a value measured by gel permeation chromatography (GPC). Specifically, the molecular weight measurement by GPC is performed with a GPC apparatus (manufactured by Tosoh corporation, HLC-8320GPC, Column: TSKgel α-M) by using a solution of dimethylacetamide/lithium chloride having a volume ratio of 90/10.

Structures

As the cellulose derivative, a compound in which at least one hydroxyl group included in cellulose is substituted with an acyl group is preferable, and specifically, the compound represented by the formula (1) described below is preferable.

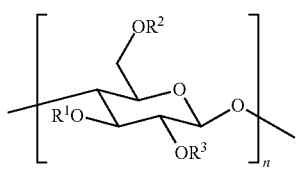

In the formula (1), $R^1$, $R^2$, and $R^3$ each independently represent a hydrogen atom and an acyl group. n represents an integer of 2 or greater. However, at least one of plural $R^1$s, plural $R^2$s, and plural $R^3$s represents an acyl group.

In the compound represented by the formula (1), if plural acyl groups exist, the respective acyl groups all may be identical to each other, may be partially identical to each other, and may be different from each other.

The range of n is not particularly limited, and may be determined according to a preferable range of the weight average molecular weight described above. Specifically, the range of n is preferably in the range of 40 to 300, and more preferably in the range of 100 to 200.

If n is 40 or greater, the strength of the resin molded article is easily increased, and if n is 300 or less, the decrease of flexibility of the resin molded article is easily prevented.

In order to easily obtain a resin molded article having a high elastic modulus and excellent heat resistance, the acyl groups represented by $R^1$, $R^2$, and $R^3$ are preferably acyl groups having 1 to 6 carbon atoms, more preferably acyl groups having 1 to 4 carbon atoms, and still more preferably acyl groups having 1 to 3 carbon atoms.

Plural $R^1$s, plural $R^2$s, and plural $R^3$s all may be identical to each other, may be partially identical to each other, or may be different from each other, respectively.

The acyl group having 1 to 6 carbon atoms is represented by a structure of "—CO—$R_{AC}$", and "$R_{AC}$" represents a hydrogen atom or a hydrocarbon group having 1 to 5 carbon atoms.

The hydrocarbon group represented by "$R_{AC}$" may have any one of a straight chain shape, a branched shape, or a cyclic shape, but preferably a straight chain shape.

The hydrocarbon group may be a saturated hydrocarbon group or an unsaturated hydrocarbon group, but preferably a saturated hydrocarbon group.

In addition, the hydrocarbon group may contain other atoms than carbon or hydrogen (for example, oxygen or nitrogen), but preferably a hydrocarbon group made of only carbon and hydrogen.

As the acyl group having 1 to 6 carbon atoms, a formyl group, an acetyl group, a propionyl group, a butanoyl group, a propenoyl group, a hexanoyl group, and the like are included.

Among them, as an acyl group, in view of the enhancement of the elastic modulus and the heat resistance of the resin molded article, and the enhancement of the moldability of the resin composition, an acetyl group is preferable.

Substitution Degree

In view of increasing saturated water absorption, the substitution degree of the cellulose derivative is preferably in the range of 1.8 to 2.5, more preferably in the range of 2.0 to 2.5, and still more preferably in the range of 2.2 to 2.5.

If the substitution degree is 2.5 or less, the interaction between substituents does not become too strong, and the decrease of mobility of molecules is prevented. Therefore, hydrogen bonds between molecules of the cellulose derivative occur, and the saturated water absorption is easily increased. Meanwhile, if the substitution degree is 1.8 or greater, hydrogen bonds in molecules of the cellulose derivative are unlikely to be formed, and thereby the hydrogen bonds between molecules of the cellulose derivatives are included in the resin composition in an almost even state, so that saturated water absorption is likely to be increased.

In addition, the substitution degree is an index indicating the degree to which the hydroxyl group included in cellulose is substituted with the substituent. As described above, if the substituent is an acyl group, the substitution degree is an index indicating a degree of acylation of a cellulose derivative. Specifically, the substitution degree means an intramolecular average of the number of substitutions with an acyl group of three hydroxyl groups included in a D-glucopyranose unit of the cellulose derivative.

Preparation Method

A method of preparing the cellulose derivative used in the exemplary embodiment is not particularly limited, and a well-known method may be employed.

Hereinafter, the method of preparing the cellulose derivative (hereinafter, referred to as "specific cellulose derivative") in which the weight average molecular weight is 10,000 or greater and less than 75,000, and at least one hydroxyl group of cellulose is substituted with an acyl group having 1 to 6 carbon atoms is described with reference to examples.

Adjustment of Molecular Weight of Cellulose

First, cellulose before acylation, that is, cellulose in which a hydroxyl group is not substituted with an acyl group is prepared, and the molecular weight is adjusted.

As the cellulose before acylation, a synthesized product may be used, or a commercially available product may be used. In addition, the cellulose is a resin derived from plants, and the weight average molecular weight thereof is generally higher than the specific cellulose derivative according to the exemplary embodiment. Therefore, the adjustment of the molecular weight of the cellulose is generally a step of decreasing the molecular weight.

For example, the weight average molecular weight of the commercially available cellulose is generally in the range of 150,000 to 500,000.

As the commercially available cellulose before acylation, for example, KC Flock (W50, W100, W200, W300G, W400G, W-100F, W60MG, W-50GK, and W-100GK), NDPT, NDPS, LNDP, and NSPP-HR manufactured by Nippon Paper Industries Co., Ltd. are included.

A method of adjusting a molecular weight of the cellulose before acylation is not particularly limited, and, for example, a method of decreasing a molecular weight by stirring the cellulose in liquid, and the like are included.

By adjusting the speed and the time when the cellulose is stirred, the molecular weight of the cellulose may be adjusted to a required value. In addition, though not particularly limited, the stirring speed when the cellulose is stirred is preferably in the range of 50 rpm to 3,000 rpm, and more preferably in the range of 1.00 rpm to 1,000 rpm. In addition, the stirring time is preferably in the range of 2 hours to 48 hours, and more preferably in the range of 5 hours to 24 hours.

In addition, as the liquid used when the cellulose is stirred, an aqueous solution of hydrochloric acid, an aqueous solution of formic acid, an aqueous solution of acetic acid, an aqueous solution of nitric acid, and an aqueous solution of sulfuric acid are included.

Preparation of Cellulose Derivative

The cellulose of which the molecular weight is adjusted by the method described above or the like is acylated by an acyl group having 1 to 6 carbon atoms in a well-known method, so as to obtain the specific cellulose derivative.

For example, if at least one hydroxyl group included in the cellulose is substituted with an acetyl group, a method of esterifying the cellulose by using a mixture of acetic acid, acetic anhydride, and sulfuric acid, or the like is included. In addition, if at least one hydroxyl group is substituted with a propionyl group, a method of esterifying the cellulose by using propionic anhydride instead of acetic anhydride in the mixture is included. If at least one hydroxyl group is substituted with a butanoyl group, a method of esterifying the cellulose by using butyric anhydride instead of acetic anhydride in the mixture is included. If at least one hydroxyl group is substituted with a hexanoyl group, a method of esterifying the cellulose by using hexanoic anhydride instead of acetic anhydride in the mixture is included.

After acylation, in order to adjust the substitution degree, a step of deacylation may be further provided. In addition, a refining step may be further provided after the acylation step or the deacylation step.

Ratio Occupied by Cellulose Derivative in Resin Composition

In the resin composition according to the exemplary embodiment, in order to cause the function of the cellulose derivative to be easily revealed, a ratio occupied by the cellulose derivative with respect to the total amount of the resin composition is preferably 70% by weight or greater, more preferably 80% by weight or greater, and may be 100% by weight. If the ratio is 70% by weight or greater, a resin molded article having excellent heat resistance and high elastic modulus may be easily obtained.

Plasticizer

The resin composition according to the exemplary embodiment may further include a plasticizer.

The content of the plasticizer is preferably an amount with which the ratio of the cellulose derivative occupied in a total amount of a resin composition is in the range described above. More specifically, the ratio of the plasticizer occupied in a total amount of a resin composition is preferably 15% by weight or lower, more preferably 10% by weight or lower, and still more preferably 5% by weight or lower. If the ratio of the plasticizer is in the range described above, a resin molded article having an excellent elastic modulus and excellent heat resistance is easily obtained, and the bleeding of the plasticizer is easily prevented.

For example, as the plasticizer, an adipic acid ester-containing compound, a polyether ester compound, a sebacic acid ester compound, a glycol ester compound, an acetic acid ester, a dibasic acid ester compound, a phosphoric acid ester compound, a phthalic acid ester compound, camphor, citric acid ester, stearic acid ester, metallic soap, polyol, polyalkylene oxide, and the like are exemplified.

Among these, an adipic acid ester-containing compound, and a polyether ester compound are preferable, and an adipic acid ester-containing compound is more preferable.

Adipic Acid Ester-containing Compound

An adipic acid ester-containing compound (compound containing adipic acid ester) refers to a compound of individual adipic acid esters, and a mixture of adipic acid ester and components other than adipic acid ester (compound different from adipic acid ester). However, the adipic acid ester-containing compound may preferably contain the adipic acid ester by 50% by weight or more with respect to the total of adipic acid ester and other components.

As the adipic acid ester, for example, an adipic acid diester, and an adipic acid polyester are exemplified. Specifically, an adipic acid diester represented by the formula (2-1) and an adipic acid polyester represented by the formula (2-2) are exemplified.

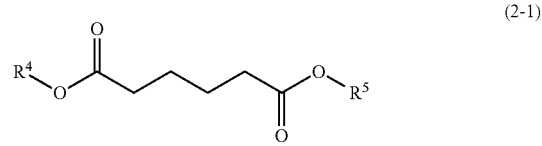

(2-1)

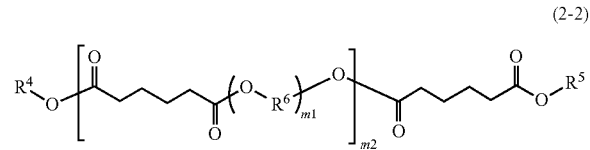

(2-2)

In the formulae (2-1) and (2-2), $R^4$ and $R^5$ each independently represents an alkyl group, or a polyoxyalkyl group [—$(C_xH_{2X}$—$O)_y$—$R^{A1}$] (provided that $R^{A1}$ represents an alkyl group, x represents an integer in the range of 1 to 10, and y represents an integer in the range of 1 to 10.).

$R^6$ represents an alkylene group.

m1 represents an integer in the range of 1 to 20.

m2 represents an integer in the range of 1 to 10.

In the formulae (2-1) and (2-2), the alkyl groups represented by $R^4$ and $R^5$ are preferably alkyl groups having 1 to 6 carbon atoms, and more preferably alkyl groups having 1 to 4 carbon atoms. The alkyl groups represented by $R^4$ and $R^5$ may have any one of a linear shape, a branched shape, or a cyclic shape, but preferably a linear shape and a branched shape.

In the formulae (2-1) and (2-2), in the polyoxyalkyl group represented by $R^4$ and $R^5$ [—$(C_xH_{2X}$—$O)_y$—$R^{A1}$], the alkyl group represented by $R^{A1}$ is preferably an alkyl group having 1 to 6 carbon atoms, and more preferably an alkyl group having 1 to 4 carbon atoms. The alkyl group represented by $R^{A1}$ may have any one of a linear shape, a branched shape, or a cyclic shape, but preferably a linear shape and a branched shape.

In the formula (2-2), the alkylene group represented by $R^6$ is preferably an alkylene group having 1 to 6 carbon atoms, and more preferably an alkylene group having 1 to 4 carbon atoms. The alkylene group represented by $R^6$ may have any one of a linear shape, a branched shape, or a cyclic shape, but preferably a linear shape and a branched shape.

In the formulae (2-1) and (2-2), the group represented by each of $R^4$ to $R^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but the invention is not limited thereto.

| | Name of Material | Name of Product | Manufacturer |
|---|---|---|---|
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Polyether Ester Compound

As the polyether ester compound, for example, a polyether ester compound represented by the formula (2) is exemplified.

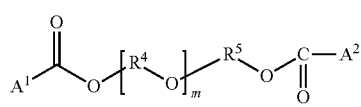

(2)

In the formula (2), $R^4$ and $R^5$ each independently represents an alkylene group having 2 to 10 carbon atoms. $A^1$ and $A^2$ each independently represents an alkyl group having 1 to 6 carbon atoms, an aryl group having 6 to 12 carbon atoms, or an aralkyl group having 7 to 13 carbon atoms. m represents an integer of 1 or greater.

In the formula (2), as the alkylene group represented by $R^4$, an alkylene group having 3 to 10 carbon atoms is preferable, and an alkylene group having 3 to 6 carbon atoms is more preferable. The alkylene group represented by $R^4$ may have any one of a linear shape, a branched shape, or a cyclic shape, but preferably a linear shape.

If the number of carbons of the alkylene group represented by $R^4$ is set to be 3 or greater, the decrease of the fluidity of the resin composition is prevented, and thermoplasticity is easily exhibited. If the number of carbons of the alkylene group represented by $R^4$ is 10 or lower, or the alkylene group represented by $R^4$ has a linear shape, the affinity to the cellulose derivative is easily enhanced. Therefore, if the alkylene group represented by $R^4$ has a linear shape, and the number of carbons is in the range described above, moldability of the resin composition is enhanced.

In this point of view, particularly, the alkylene group represented by $R^4$ is preferably a n-hexylene group (—$(CH_2)_6$—). That is, the polyether ester compound is preferably a compound where $R^4$ represents a n-hexylene group (—$(CH_2)_6$—).

In the formula (2), as the alkylene group represented by $R^5$, an alkylene group having 3 to 10 carbon atoms is preferable, and an alkylene group having 3 to 6 carbon atoms is more preferable. The alkylene group represented by $R^5$ may have any one of a linear shape, a branched shape, or a cyclic shape, but preferably a linear shape.

If the number of carbons of the alkylene group represented by $R^5$ is 3 or greater, the decrease of the fluidity of the resin composition is prevented, and the thermoplasticity is easily exhibited. If the number of carbons of the alkylene group represented by $R^5$ is 10 or lower, or if the alkylene group represented by $R^5$ has a linear shape, the affinity to the cellulose derivative is easily enhanced. Therefore, if the alkylene group represented by $R^5$ has a linear shape, and the number of carbons is in the range described above, moldability of the resin composition is enhanced.

In this point of view, particularly, the alkylene group represented by $R^5$ is preferably a n-butylene group (—$(CH_2)_4$—). That is, the polyether ester compound is preferably a compound where $R^5$ represents a n-butylene group (—$(CH_2)_4$—).

In the formula (2), the alkyl groups represented by $A^1$ and $A^2$ are alkyl groups having 1 to 6 carbon atoms, and alkyl groups having 2 to 4 carbon atoms are more preferable. The alkyl groups represented by $A^1$ and $A^2$ may have any one of a linear shape, a branched shape, or a cyclic shape, but preferably a branched shape.

The aryl groups represented by $A^1$ and $A^2$ are aryl groups having 6 to 12 carbon atoms, and as examples thereof, an unsubstituted aryl group such as a phenyl group and a naphthyl group or a substituted phenyl group such as a t-butylphenyl group and a hydroxyphenyl group are exemplified.

The aralkyl group represented by $A^1$ and $A^2$ is a group represented by —$R^A$-Ph. $R^A$ represents a linear-shaped or branched alkylene group having 1 to 6 carbon atoms (preferably, having 2 to 4 carbon atoms). Ph represents an unsubstituted phenyl group or a substituted phenyl group which is substituted with the linear-shaped or branched alkyl group having 1 to 6 carbon atoms (preferably, having 2 to 6 carbon atoms). As the aralkyl group, specifically, for example, an unsubstituted aralkyl group such as a benzil group, a phenylmethyl group (phenethyl group), a phenylpropyl group, and a phenylbutyl group, and a substituted aralkyl group such as a methylbenzil group, a dimethylbenzil group, and a methylphenethyl group are exemplified.

At least one of $A^1$ and $A^2$ preferably represents an aryl group or an aralkyl group. That is, the polyether ester compound is preferably a compound where at least one of $A^1$ and $A^2$ represents an aryl group (preferably, phenyl group) or an aralkyl group, and preferably a compound where both of $A^1$ and $A^2$ represent an aryl group (preferably, phenyl group) or an aralkyl group.

Subsequently, characteristics of the polyether ester compound are described.

The weight average molecular weight (Mw) of the polyether ester compound is preferably in the range of 450 to 650, and more preferably in the range of 500 to 600.

If the weight average molecular weight (Mw) is 450 or greater, bleeding (phenomenon of deposition) becomes difficult. If the weight average molecular weight (Mw) is 650 or lower, the affinity to the cellulose derivative is easily enhanced. Therefore, if the weight average molecular weight (Mw) is in the range described above, moldability of the resin composition is enhanced.

In addition, the weight average molecular weight (Mw) of the polyether ester compound is a value measured by gel permeation chromatography (GPC). Specifically, the measurement of the molecular weight by GPC is performed by using HPLC1100 manufactured by Tosoh corporation as a measurement apparatus, and TSKgel GMHHR-M+TSKgel GMHHR-M (7.8 mm I.D. 30 cm) which is a column manufactured by Tosoh Corporation, with a chloroform solvent. Also, the weight average molecular weight is calculated by using a molecular weight calibration curve obtained by a monodispersed polystyrene standard sample from the measurement result.

The viscosity of the polyether ester compound at 25° C. is preferably in the range of 35 mPa·s to 50 mPa·s, and more preferably in the range of 40 mPa·s to 45 mPa·s.

If the viscosity is 35 mPa·s or greater, the dispersibility to the cellulose derivative is easily enhanced. If the viscosity is 50 mPa·s or lower, anisotropy of the dispersion of the polyether ester compound hardly appears. Therefore, if the viscosity is in the range described above, the moldability of the resin composition is enhanced.

In addition, the viscosity is a value measured by an E-type viscosmeter.

A solubility parameter (SP value) of the polyether ester compound is preferably in the range of 9.5 to 9.9, and more preferably in the range of 9.6 to 9.8.

If the solubility parameter (SP value) is in the range of 9.5 to 9.9, dispersibility to the cellulose derivative is easily enhanced.

The solubility parameter (SP value) is a value calculated by a Fedor method, and specifically, the solubility parameter (SP value) is, for example, calculated by the following equation in conformity with the description in Polym. Eng. Sci., vol. 14, p. 147 (1974).

$$\text{SP value} = \sqrt{(Ev/v)} = \sqrt{(\Sigma\Delta ei/\Sigma\Delta vi)} \quad \text{Equation:}$$

(In the equation, Ev: evaporation energy (cal/mol), v: molar volume (cm$^3$/mol), $\Delta ei$: evaporation energy of each atom or atom group, and $\Delta vi$: molar volume of each atom or atom group)

In addition, the solubility parameter (SP value) employs (cal/cm$^3$)$^{1/2}$ as a unit, but the unit is omitted in conformity with practice, and is described in a dimensionless manner.

Hereinafter, specific examples of the polyether ester compound are described, but the invention is not limited thereto.

to 5% by weight with respect to the total amount of the resin composition. Here, the expression "0% by weight" means not including other components.

The resin composition according to the exemplary embodiment may contain other resins in addition to the resin described above. However, the other resins are included in amounts with which the ratio of the cellulose derivative occupied in the total amount of the resin composition becomes in the range described above.

As the other resins, for example, the thermoplastic resins which are well-known in the art are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyether nitrile resin; a liquid crystal resin; a polybenzimidazole resin; polyparabanic acid resin; a vinyl polymer or a vinyl copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; a vinyl chloride resin; and a chlorinated vinyl chloride resin are exemplified. These resins may be used singly, or two or more types thereof may be used in combination.

| | R$^4$ | R$^5$ | A$^1$ | A$^2$ | Mw | Viscosity (25° C.) | APHA | SP value |
|---|---|---|---|---|---|---|---|---|
| PEE1 | —(CH$_2$)$_6$— | —(CH$_2$)$_4$— | Phenyl group | Phenyl group | 550 | 43 | 120 | 9.7 |
| PEE2 | —(CH$_2$)$_2$— | —(CH$_2$)$_4$— | Phenyl group | Phenyl group | 570 | 44 | 115 | 9.4 |
| PEE3 | —(CH$_2$)$_{10}$— | —(CH$_2$)$_4$— | Phenyl group | Phenyl group | 520 | 48 | 110 | 10.0 |
| PEE4 | —(CH$_2$)$_6$— | —(CH$_2$)$_2$— | Phenyl group | Phenyl group | 550 | 43 | 115 | 9.3 |
| PEE5 | —(CH$_2$)$_6$— | —(CH$_2$)$_{10}$— | Phenyl group | Phenyl group | 540 | 45 | 115 | 10.1 |
| PEE6 | —(CH$_2$)$_6$— | —(CH$_2$)$_4$— | t-Butyl group | t-Butyl group | 520 | 44 | 130 | 9.7 |
| PEE7 | —(CH$_2$)$_6$— | —(CH$_2$)$_4$— | Phenyl group | Phenyl group | 460 | 45 | 125 | 9.7 |
| PEE8 | —(CH$_2$)$_6$— | —(CH$_2$)$_4$— | Phenyl group | Phenyl group | 630 | 40 | 120 | 9.7 |
| PEE9 | —(CH$_2$)$_6$— | —(CH$_2$)$_4$— | Phenyl group | Phenyl group | 420 | 43 | 135 | 9.7 |
| PEE10 | —(CH$_2$)$_6$— | —(CH$_2$)$_4$— | Phenyl group | Phenyl group | 670 | 48 | 105 | 9.7 |
| PEE11 | —(CH$_2$)$_6$— | —(CH$_2$)$_4$— | Phenyl group | Phenyl group | 550 | 35 | 130 | 9.7 |
| PEE12 | —(CH$_2$)$_6$— | —(CH$_2$)$_4$— | Phenyl group | Phenyl group | 550 | 49 | 125 | 9.7 |
| PEE13 | —(CH$_2$)$_6$— | —(CH$_2$)$_4$— | Phenyl group | Phenyl group | 550 | 32 | 120 | 9.7 |
| PEE14 | —(CH$_2$)$_6$— | —(CH$_2$)$_4$— | Phenyl group | Phenyl group | 550 | 53 | 105 | 9.7 |
| PEE15 | —(CH$_2$)$_6$— | —(CH$_2$)$_4$— | Phenyl group | Phenyl group | 550 | 43 | 135 | 9.7 |
| PEE16 | —(CH$_2$)$_6$— | —(CH$_2$)$_4$— | Phenyl group | Phenyl group | 550 | 43 | 105 | 9.7 |
| PEE17 | —(CH$_2$)$_6$— | —(CH$_2$)$_4$— | Phenyl group | Phenyl group | 550 | 43 | 150 | 9.7 |
| PEE18 | —(CH$_2$)$_6$— | —(CH$_2$)$_4$— | Phenyl group | Phenyl group | 550 | 43 | 95 | 9.7 |

Other Components

The resin composition according to the exemplary embodiment may contain other components in addition to the components described above, if necessary. As the other components, for example, a flame retardant, a compatibilizer, an antioxidant, a release agent, a light resistant agent, a weather resistant agent, a colorant, pigments, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are exemplified. The content of the respective components is in the range of 0% by weight Method of Preparing Resin Composition The resin composition according to the exemplary embodiment is prepared, for example, by melting and kneading the mixture of the cellulose derivative and the components described above. In addition, the resin composition according to the exemplary embodiment is prepared by dissolving the components in a solvent. As a melting and kneading unit, well known units are included, and specifically, for example, a twin screw extruder, a Henschel mixer, a Banbury mixer, a single screw extruder, a multi-screw extruder, and a co-kneader are included.

In addition, the temperature at the time of kneading may be determined according to the melting temperature of the cellulose derivative used, but in view of the thermal decomposition and the fluidity, the temperature in the range of 140° C. to 240° C. is preferable, and the temperature in the range of 160° C. to 200° C. is more preferable.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 240° C., preferably in the range of 150° C. to 220° C., and more preferably in the range of 160° C. to 200° C. The mold temperature of the injection molding is, for example, in the range of 30° C. to 120° C., and more preferably in the range of 40° C. to 80° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

EXAMPLES

Hereinafter, the invention is described in greater detail with reference to examples, but the invention is not limited to the examples. In addition, unless described otherwise, the expression "part" refers to "part by weight".

Preparation of Cellulose 2 kg of cellulose (KC Flock W50 manufactured by Nippon Paper Industries Co., Ltd.) is put to 20 L of an aqueous solution of 0.1 M hydrochloric acid, and stirred at room temperature (25° C.). In stirring time shown in Table 1, cellulose in respective molecular weights is obtained. In addition, EP-1800 (product name, manufactured by Shinto Scientific Co., Ltd.) is used as a stirring apparatus, and the rotation speed at the time of stirring is set to 500 rpm.

The weight average molecular weight is measured with a GPC apparatus (manufactured by Tosoh corporation, HLC-8320GPC, Column: TSKgel α-M), by using a solution of dimethylacetamide/lithium chloride having a volume ratio of 90/10.

TABLE 1

|  | Stirring time (hr) | Weight average molecular weight |
|---|---|---|
| Compound 1 | 0.3 | 75,500 |
| Compound 2 | 1 | 57,800 |
| Compound 3 | 2 | 31,000 |
| Compound 4 | 3 | 10,300 |
| Compound 5 | 5 | 9,400 |

Preparation of Cellulose Derivative

Acetylation Step

Pretreatment activation is performed by spraying 1 kg of Compound 1 in Table 1, with 500 g of glacial acetic acid. Thereafter, a mixture of 3.8 kg of glacial acetic acid, 2.4 kg of acetic anhydride, and 80 g of sulfuric acid is added, and esterification of Compound 1 is performed while the mixture is stirred and mixed at a temperature of 40° C. or lower. Esterification is finished when fiber fragments disappear.

Deacetylation Step 2 kg of acetic acid and 1 kg of water are added to the mixture, and stirred for 2 hours at room temperature (25° C.).

Refinement Step

Further, this solution is slowly dripped to a solution obtained by dissolving 20 kg of sodium hydroxide in 40 kg of water while the solution is stirred. The obtained white precipitate is suction-filtered and washed with 60 kg of water, and a cellulose derivative (Compound 6) is obtained.

Cellulose derivatives (Compounds 7 to 10) are obtained in the same manner as described above except for changing Compound 1 to Compounds 2 to 5.

A cellulose derivative (Compound 11) is obtained in the same manner as described above except for using Compound 3 performing a refinement step right after an acetylation step is finished.

Cellulose derivatives (Compounds 12 to 16) are obtained in the same manner as described above except for using Compound 3 changing stirring time in deacetylation steps to 0.5 hours, 1 hour, 3 hours, 5 hours, and 10 hours, respectively.

Cellulose derivatives (Compounds 17 to 19) are obtained in the same manner as described above except for using Compound 3 and changing 2.4 kg of acetic anhydride in an acetylation step respectively to 2 kg of propionic anhydride/0.3 kg of acetic anhydride and 1.8 kg of n-butyric anhydride/6 kg of acetic anhydride and 0.5 kg of n-hexanoic anhydride.

Weight average molecular weights of the obtained cellulose derivatives (Compounds 6 to 19) are obtained in the same manner as in Compound 1, and substitution degrees are obtained with $H^1$-NMR measurement (JNM-ECZR manufactured by JEOL Ltd.).

The results are collectively shown in Table 2.

TABLE 2

| | Weight average molecular weight | Substituent | Substitution degree |
|---|---|---|---|
| Compound 6 | 79,800 | Acetyl | 2.15 |
| Compound 7 | 63,300 | Acetyl | 2.22 |
| Compound 8 | 38,800 | Acetyl | 2.25 |
| Compound 9 | 11,000 | Acetyl | 2.21 |
| Compound 10 | 9,900 | Acetyl | 2.19 |
| Compound 11 | 42,300 | Acetyl | 2.78 |
| Compound 12 | 40,500 | Acetyl | 2.59 |
| Compound 13 | 39,000 | Acetyl | 2.48 |
| Compound 14 | 37,000 | Acetyl | 1.65 |
| Compound 15 | 36,100 | Acetyl | 0.38 |
| Compound 16 | 35,800 | Acetyl | 0.25 |
| Compound 17 | 42,500 | n-propionyl/acetyl | 2.05/0.35 |
| Compound 18 | 44,300 | n-butanoyl/acetyl | 1.88/0.55 |
| Compound 19 | 36,000 | n-hexanoyl | 0.55 |

Cellulose Derivatives C-1 to C-6 obtained in Synthesis Examples 1 to 6 (paragraphs [0107] to [0112]) of Japanese Patent No. 5,470,032 are set to Compounds 20 to 25, respectively, as shown in Table 3 below.

TABLE 3

| | Synthesis example of Japanese Patent No. 5,470,032 | Weight average molecular weight | Substituent | Substitution degree* |
|---|---|---|---|---|
| Compound 20 | C-1 | 185,000 | Methyl/propylene oxy acetyl + acetyl | 1.95/1.05 |
| Compound 21 | C-2 | 617,000 | Methyl/propylene oxy acetyl + acetyl | 1.84/1.16 |
| Compound 22 | C-3 | 770,000 | Methyl/propylene oxy acetyl + acetyl | 1.47/1.53 |
| Compound 23 | C-4 | 680,000 | Methyl/propylene oxy acetyl + acetyl | 1.45/1.55 |
| Compound 24 | C-5 | 402,000 | Methyl/propylene oxy propionyl + propionyl | 1.5/1.5 |
| Compound 25 | C-6 | 237,000 | Methyl/propylene oxy acetyl + acetyl | 1.43/1.57 |

*Substitution degree of alkyl/Sum of substitution degree of alkyleneozyacyl and substitution degree of acyl Preparation of Pellets Kneading is performed with a twin screw kneading apparatus (TEX41SS manufactured by Toshiba Machine Co., Ltd.) at kneading temperatures in mixing ratio compositions shown in Examples 1 to 23 and Comparative Examples 1 to 10 shown in Table 4, so as to obtain resin composition pellets.

TABLE 4

| | Composition ratio | | | | | | Kneading temperature (° C.) | Saturated water absorption of pellets (%) |
|---|---|---|---|---|---|---|---|---|
| | Cellulose derivatives | | | | Plasticizer | | | |
| | Kind | Amount (parts by weight) | Kind | Amount (parts by weight) | Kind | Amount (parts by weight) | | |
| Example 1 | Compound 7 | 100 | | | | | 200 | 7.8 |
| Example 2 | Compound 8 | 100 | | | | | 190 | 8.2 |
| Example 3 | Compound 9 | 100 | | | | | 180 | 8.1 |
| Example 4 | Compound 11 | 100 | | | | | 180 | 7.2 |
| Example 5 | Compound 12 | 100 | | | | | 190 | 7.1 |
| Example 6 | Compound 13 | 100 | | | | | 190 | 8.0 |
| Example 7 | Compound 14 | 100 | | | | | 190 | 7.3 |
| Example 8 | Compound 15 | 100 | | | | | 200 | 7.1 |
| Example 9 | Compound 16 | 100 | | | | | 200 | 7.2 |
| Example 10 | Compound 17 | 100 | | | | | 160 | 7.8 |
| Example 11 | Compound 18 | 100 | | | | | 160 | 7.8 |
| Example 12 | Compound 19 | 100 | | | | | 170 | 7.1 |
| Example 13 | Compound 8 | 95 | | | Compound 27 | 5 | 180 | 8.5 |
| Example 14 | Compound 8 | 90 | | | Compound 27 | 10 | 160 | 8.2 |
| Example 15 | Compound 8 | 85 | | | Compound 27 | 15 | 150 | 8.1 |
| Example 16 | Compound 7 | 90 | Compound 26 | 10 | | | 220 | 8.2 |
| Example 17 | Compound 7 | 80 | Compound 26 | 20 | | | 210 | 7.9 |
| Example 18 | Compound 7 | 70 | Compound 26 | 30 | | | 200 | 7.2 |
| Example 19 | Compound 8 | 90 | Compound 26 | 10 | | | 190 | 8.1 |
| Example 20 | Compound 8 | 80 | Compound 26 | 20 | | | 190 | 8.2 |
| Example 21 | Compound 8 | 70 | Compound 26 | 30 | | | 200 | 8.4 |
| Example 22 | Compound 7 | 75 | Compound 26 | 20 | Compound 27 | 5 | 200 | 7.8 |
| Example 23 | Compound 8 | 75 | Compound 26 | 20 | Compound 27 | 5 | 180 | 7.9 |
| Comparative Example 1 | Compound 6 | 100 | | | | | 200 | 6.3 |
| Comparative Example 2 | Compound 10 | 100 | | | | | 170 | 6.8 |
| Comparative Example 3 | Compound 6 | 90 | | | Compound 27 | 10 | 180 | 5.1 |

TABLE 4-continued

| | Composition ratio | | | | | | Saturated |
| --- | --- | --- | --- | --- | --- | --- | --- |
| | Cellulose derivatives | | | Plasticizer | | | water |
| | Kind | Amount (parts by weight) | Kind | Amount (parts by weight) | Kind | Amount (parts by weight) | Kneading temperature (° C.) | absorption of pellets (%) |
| Comparative Example 4 | Compound 10 | 90 | | | Compound 27 | 10 | 160 | 5.0 |
| Comparative Example 5 | Compound 20 | 100 | | | | | 200 | 4.8 |
| Comparative Example 6 | Compound 21 | 100 | | | | | 205 | 5.2 |
| Comparative Example 7 | Compound 22 | 100 | | | | | 200 | 4.4 |
| Comparative Example 8 | Compound 23 | 100 | | | | | 200 | 4.9 |
| Comparative Example 9 | Compound 24 | 100 | | | | | 190 | 5.0 |
| Comparative Example 10 | Compound 25 | 100 | | | | | 190 | 4.9 |

In addition, details of Compounds 26 and 27 shown in Table 4 are shown below.

Compound 26: Dimethyl cellulose (L50 manufactured by Daicel Corporation, weight average molecular weight: 170,000)

Compound 27: Adipic acid ester-containing compound (Daifatty 101 manufactured by Daihachi Chemical Industry Co., Ltd.)

Measurement of Saturated Water Absorption of Pellets

With respect to the obtained pellets, saturated water absorption is measured by a method in conformity with ISO 62:1999. The results are shown in Table 4.

Injection Molding

With the obtained pellets, ISO multipurpose dumbbell test samples (test portion: 100 mm in length, 10 mm in width, and 4 mm in thickness) are prepared by using an injection molding machine (PNX40 manufactured by Nissei Plastic Industrial Co., Ltd.) at cylinder temperatures and mold temperatures shown in Table 5.

Measurement of Saturated Water Absorption of Resin Molded Article

With the obtained dumbbell test samples (resin molded article), saturated water absorption is measured by the method in conformity with ISO 62:1999. The results are shown in Table 5.

Bending Elastic Modulus

With respect to the obtained dumbbell test samples, bending elastic modulus are measured with a method in conformity with ISO-178 by using a universal, testing device (Autograph AG-Xplus manufactured by Shimadzu Corporation). The results are shown in Table 5.

Heat Resistance (Deflection Temperature Under Load)/Heat Resistance Evaluation

Deflection temperatures under load are measured by using the obtained dumbbell test samples and an apparatus for measuring deflection temperature under load (HDT-3 manufactured by Toyo Seiki Seisaku-sho Ltd.) by a method in conformity with ISO75, under the condition of load of 1.8 MPa. The results are shown in Table 5.

TABLE 5

| | Molding condition | | | | Deflection |
| --- | --- | --- | --- | --- | --- |
| | Cylinder temperature (° C.) | Mold temperature (° C.) | Saturated water absorption (%) | Bending elastic modulus (MPa) | temperature under load of 1.8 MPa (° C.) |
| Example 1 | 200 | 40 | 7.8 | 4400 | 115 |
| Example 2 | 190 | 40 | 8.2 | 4300 | 118 |
| Example 3 | 180 | 40 | 8.1 | 4400 | 114 |
| Example 4 | 180 | 40 | 7.2 | 4800 | 91 |
| Example 5 | 190 | 40 | 7.1 | 4600 | 86 |
| Example 6 | 190 | 40 | 8.0 | 4400 | 114 |
| Example 7 | 190 | 40 | 7.3 | 4500 | 82 |
| Example 8 | 200 | 40 | 7.1 | 4550 | 80 |
| Example 9 | 200 | 40 | 7.2 | 4800 | 82 |
| Example 10 | 160 | 40 | 7.9 | 4000 | 93 |
| Example 11 | 160 | 40 | 7.8 | 3800 | 92 |
| Example 12 | 170 | 40 | 7.1 | 3800 | 91 |
| Example 13 | 180 | 40 | 8.5 | 4100 | 103 |
| Example 14 | 160 | 40 | 8.2 | 4050 | 97 |
| Example 15 | 150 | 40 | 8.1 | 3750 | 85 |
| Example 16 | 220 | 40 | 8.2 | 5450 | 125 |
| Example 17 | 210 | 40 | 7.9 | 5400 | 128 |
| Example 18 | 200 | 40 | 7.2 | 5400 | 129 |
| Example 19 | 190 | 40 | 8.1 | 4350 | 103 |
| Example 20 | 190 | 40 | 8.2 | 4400 | 100 |
| Example 21 | 200 | 40 | 8.4 | 4350 | 96 |
| Example 22 | 200 | 40 | 7.8 | 5000 | 155 |
| Example 23 | 180 | 40 | 7.9 | 4050 | 89 |
| Comparative Example 1 | 200 | 40 | 6.3 | 3000 | 83 |
| Comparative Example 2 | 170 | 40 | 6.8 | 1750 | 59 |
| Comparative Example 3 | 180 | 40 | 5.1 | 2850 | 75 |
| Comparative Example 4 | 160 | 40 | 5.0 | 1350 | 53 |
| Comparative Example 5 | 200 | 40 | 4.8 | 1550 | 80 |
| Comparative Example 6 | 205 | 40 | 5.2 | 1450 | 92 |
| Comparative Example 7 | 200 | 40 | 4.4 | 1400 | 106 |
| Comparative Example 8 | 200 | 40 | 4.9 | 1300 | 102 |
| Comparative Example 9 | 190 | 40 | 5.0 | 1550 | 69 |
| Comparative Example 10 | 190 | 40 | 4.9 | 1550 | 99 |

It is found that the resin molded articles in the respective examples have high elastic modulus, compared with the resin molded articles in Comparative Examples 1 to 10 obtained by molding resin compositions of which the saturated water absorption is less than 7%.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a cellulose derivative having a weight average molecular weight in a range of 10,000 or greater and less than 75,000,
   wherein a saturated water absorption of the resin composition is in a range of 7% or greater.

2. The resin composition according to claim 1, wherein the saturated water absorption of the resin composition is in a range of 7% to 20%.

3. The resin composition according to claim 1, wherein the saturated water absorption of the resin composition is in a range of 8% to 20%.

4. The resin composition according to claim 1, wherein the weight average molecular weight of the cellulose derivative is in a range of 20,000 to 50,000.

5. The resin composition according to claim 1, wherein the cellulose derivative is a cellulose derivative in which at least one hydroxyl group of cellulose is substituted with an acyl group, and
   a substitution degree of the acyl group is in a range of 1.8 to 2.5.

6. The resin composition according to claim 5, wherein the substitution degree of the acyl group in the cellulose derivative is in a range of 2.0 to 2.5.

7. The resin composition according to claim 5, wherein the substitution degree of the acyl group in the cellulose derivative is in a range of 2.2 to 2.5.

8. The resin composition according to claim 1, wherein a ratio occupied by the cellulose derivative with respect to a total amount of the resin composition is 70% by weight or greater.

9. The resin composition according to claim 5, wherein a ratio occupied by the cellulose derivative with respect to a total amount of the resin composition is 70% by weight or greater.

10. A resin molded article comprising:
    the resin composition according to claim 1.

11. The resin molded article according to claim 10, which is molded by injection molding.

12. The resin composition according to claim 1, wherein the weight average molecular weight of the cellulose derivative is in a range of 20,000 or greater and less than 75,000.

13. The resin composition according to claim 1, wherein the cellulose derivative is a cellulose derivative in which at least one hydroxyl group of cellulose is substituted with an acyl group having 1 to 3 carbon atoms.

14. The resin composition according to claim 1, wherein a ratio occupied by the cellulose derivative with respect to a total amount of the resin composition is 80% by weight or greater.

* * * * *